United States Patent
Swaminathan et al.

(10) Patent No.: US 10,489,601 B2
(45) Date of Patent: Nov. 26, 2019

(54) ENCRYPTED EXTENDED SYSTEM EVENT LOG

(71) Applicant: American Megatrends International, LLC, Norcross, GA (US)

(72) Inventors: Viswanathan Swaminathan, Suwanee, GA (US); David Wise, Loganville, GA (US); Samvinesh Christopher, Suwanee, GA (US); Maheswari Alagarsamy, Chennai (IN); Satheesh Thomas, Dunwoody, GA (US)

(73) Assignee: American Megatrends International, LLC, Norcross, GA (US)

( * ) Notice: Subject to any disclaimer, the term of this patent is extended or adjusted under 35 U.S.C. 154(b) by 133 days.

(21) Appl. No.: 15/617,508

(22) Filed: Jun. 8, 2017

(65) Prior Publication Data

US 2018/0357425 A1    Dec. 13, 2018

(51) Int. Cl.
| | |
|---|---|
| *G06F 11/30* | (2006.01) |
| *G06F 21/60* | (2013.01) |
| *G06F 21/62* | (2013.01) |
| *G06F 21/55* | (2013.01) |
| *G06F 12/14* | (2006.01) |

(52) U.S. Cl.
CPC ......... *G06F 21/602* (2013.01); *G06F 21/552* (2013.01); *G06F 21/6209* (2013.01); *G06F 2221/2107* (2013.01)

(58) Field of Classification Search
CPC .............. G06F 21/602; G06F 21/6209; G06F 2221/2107; G06F 3/0623; G06F 3/0656; G06F 3/0659; G06F 3/0673
USPC ...................... 713/2, 193; 707/827
See application file for complete search history.

(56) References Cited

U.S. PATENT DOCUMENTS

| | | | | |
|---|---|---|---|---|
| 2008/0059784 | A1* | 3/2008 | Fu .......................... | H04L 12/66 713/2 |
| 2009/0089624 | A1* | 4/2009 | Austen ................ | G06F 11/0727 714/39 |
| 2012/0030181 | A1* | 2/2012 | Adhiraju ................. | G06F 16/93 707/661 |
| 2012/0221166 | A1* | 8/2012 | Fukuda .............. | G05D 23/1919 700/300 |
| 2014/0172919 | A1* | 6/2014 | Johnston ............... | H04L 41/069 707/797 |
| 2015/0032784 | A1* | 1/2015 | Hu ........................ | G06F 16/182 707/827 |
| 2015/0149753 | A1* | 5/2015 | Huang ................ | G06F 11/2289 713/2 |
| 2015/0188715 | A1* | 7/2015 | Castellucci ......... | G06F 16/1734 713/178 |
| 2015/0193336 | A1* | 7/2015 | Zhou .................... | G06F 11/0706 711/103 |
| 2016/0191469 | A1* | 6/2016 | Zatko .................. | H04L 63/0428 713/150 |

(Continued)

*Primary Examiner* — Gary S Gracia
(74) *Attorney, Agent, or Firm* — Locke Lord LLP; Tim Tingkang Xia, Esq.

(57) ABSTRACT

In an aspect of the disclosure, a method, a computer-readable medium, and an apparatus are provided. The apparatus may be a BMC. The BMC stores an extended SEL record entry in a data repository. The extended SEL record entry including a locator to a data collection stored external to the data repository. The BMC further retrieves the data collection based on the locator in response to receiving a request-to-retrieve-an-SEL-record.

18 Claims, 8 Drawing Sheets

(56) References Cited

U.S. PATENT DOCUMENTS

2016/0246754 A1* 8/2016 Rao .................... G06F 13/4286
2017/0097880 A1* 4/2017 Yeh .................... G06F 11/3003
2017/0109235 A1* 4/2017 Hung ................. G06F 11/1417
2017/0131991 A1* 5/2017 Su ............................ G06F 8/66

* cited by examiner

ENCRYPTED EXTENDED SYSTEM EVENT LOG

BACKGROUND

Field

The present disclosure relates generally to computer systems, and more particularly, to a baseboard management controller (BMC) that utilizes an encrypted extended system event log.

Background

The statements in this section merely provide background information related to the present disclosure and may not constitute prior art.

Considerable developments have been made in the arena of server management. An industry standard called Intelligent Platform Management Interface (IPMI), described in, e.g., "IPMI: Intelligent Platform Management Interface Specification, Second Generation," v.2.0, Feb. 12, 2004, defines a protocol, requirements and guidelines for implementing a management solution for server-class computer systems. The features provided by the IPMI standard include power management, system event logging, environmental health monitoring using various sensors, watchdog timers, field replaceable unit information, in-band and out of band access to the management controller, SNMP traps, etc.

A component that is normally included in a server-class computer to implement the IPMI standard is known as a Baseboard Management Controller (BMC). A BMC is a specialized microcontroller embedded on the motherboard of the computer, which manages the interface between the system management software and the platform hardware. The BMC generally provides the "intelligence" in the IPMI architecture.

The BMC may be considered as an embedded-system device or a service processor. A BMC may require a firmware image to make them operational. "Firmware" is software that is stored in a read-only memory (ROM) (which may be reprogrammable), such as a ROM, programmable read-only memory (PROM), erasable programmable read-only memory (EPROM), electrically erasable programmable read-only memory (EEPROM), etc.

As defined in the IPMI Specification, the System Event Log (SEL) is a non-volatile repository for system events. Each record in the SEL is a fixed 16-byte. Therefore, there is a need to provide additional encrypted data beyond the limited 16 bytes.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In an aspect of the disclosure, a method, a computer-readable medium, and an apparatus are provided. The apparatus may be a BMC. The BMC stores an extended SEL record entry in a data repository. The extended SEL record entry including a locator to a data collection stored external to the data repository. The BMC further retrieves the data collection based on the locator in response to receiving a request-to-retrieve-an-SEL-record.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

DETAILED DESCRIPTION

Figure 1:
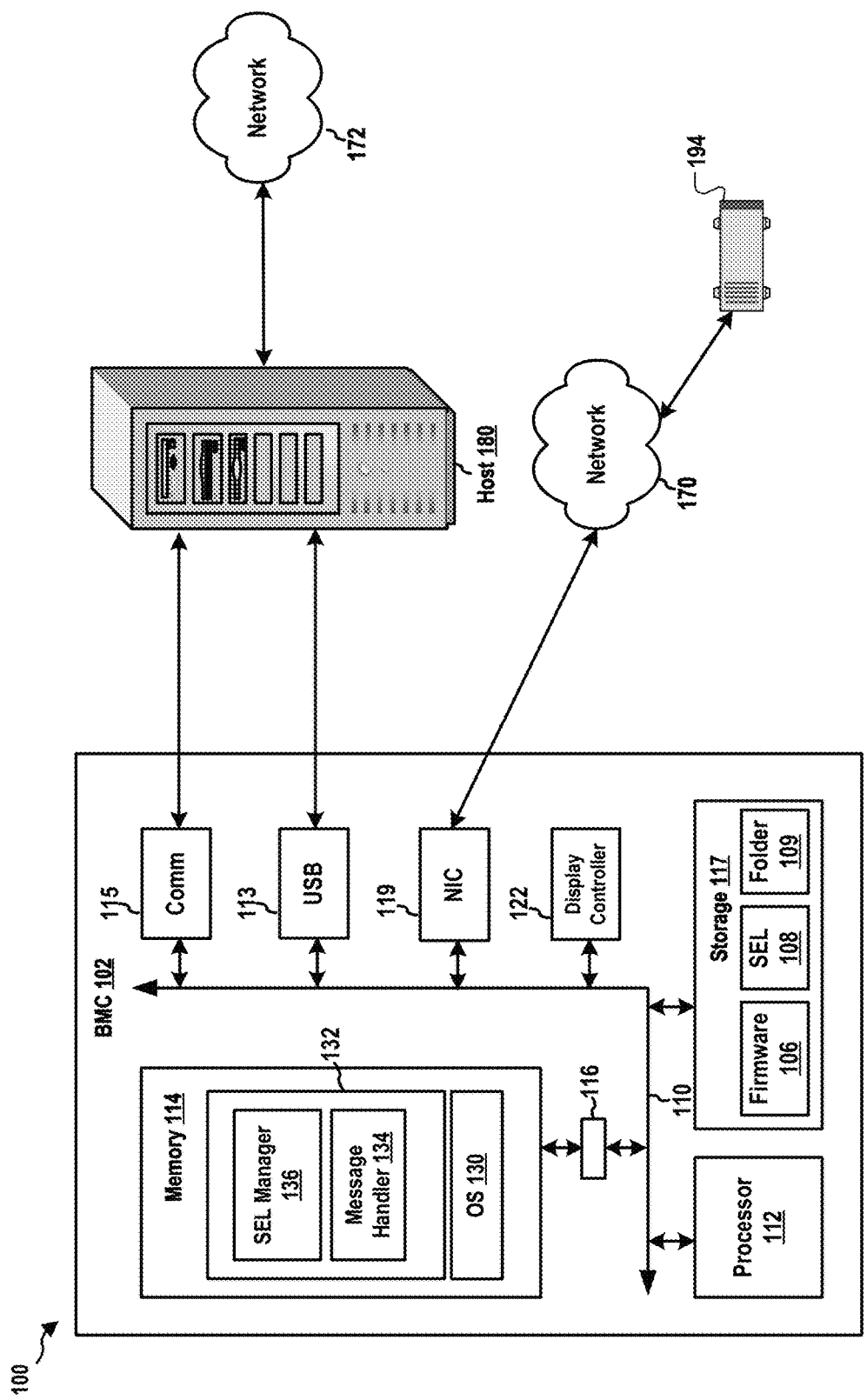
FIG. 1 is a diagram illustrating a computer system.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of computer systems will now be presented with reference to various apparatus and methods. These apparatus and methods will be described in the following detailed description and illustrated in the accompanying drawings by various blocks, components, circuits, processes, algorithms, etc. (collectively referred to as elements). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a processing system that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example embodiments, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer executable code in the form of instructions or data structures that can be accessed by a computer.

FIG. 1 is a diagram 100 illustrating a computer system. In this example, the computer system includes, among other devices, a BMC 102 and a host computer 180. The BMC 102 has, among other components, a processing unit 112, a memory 114, a memory driver 116, a display controller 122, a storage 117, a network interface card 119, a USB interface 113, and communication interfaces 115.

The communication interfaces 115 may include a keyboard controller style (KCS), a server management interface chip (SMIC), a block transfer (BT) interface, a system management bus system interface (SSIF), and/or other suitable communication interface(s). Further, the BMC 102 supports IPMI and provides an IPMI interface between the BMC 102 and the host computer 180. The IPMI interface may be implemented over one or more of the USB interface 113, the network interface card 119, and the communication interfaces 115.

In certain configurations, one or more of the above components may be implemented as a system-on-a-chip (SoC). For examples, the processing unit 112, the memory 114, the memory driver 116, the display controller 122, the storage 117, the network interface card 119, the USB interface 113, and/or the communication interfaces 115 may be on the same chip. In addition, the memory 114, the processing unit 112, the memory driver 116, the display controller 122, the storage 117, the communication interfaces 115, and/or the network interface card 119 may be in communication with each other through a communication channel 110 such as a bus architecture.

The BMC 102 may store BMC firmware 106 in the storage 117. When the processing unit 112 executes the BMC firmware 106, the processing unit 112 loads code and data of the BMC firmware 106 into the memory 114. In particular, the BMC firmware 106 can provide in the memory 114 an OS 130 (operating system), an IPMI service 132, and one or more other service components. The IPMI service 132 includes a message handler 134 and an SEL manager 136. The IPMI service 132 and the other service components may be implemented as a service stack. As such, the BMC firmware 106 provides an embedded system to the BMC 102.

Further, the storage 117 may also include an SEL 108 (system event log) and an SEL file folder 109. As described infra, the SEL manager 136 can store extended SEL record entries in the SEL 108, retrieve extended SEL record entries from the SEL 108, and manage the extended SEL record entries stored in the SEL 108. An extended SEL record entry includes a locator that points to an SEL file stored in the SEL file folder 109.

The BMC 102 may be in communication with the host computer 180 through the USB interface 113, the network interface card 119, the communication interfaces 115, and/or the IPMI interface. The host computer 180 includes various components including one or more host services. The service stack of the BMC 102 manages the host computer 180 and is responsible for managing and monitoring the server vitals such as temperature and voltage levels. The service stack can also facilitate administrators to remotely access and manage the host computer 180. In particular, the BMC 102 may manage the host computer 180 in accordance with IPMI. The IPMI service 132 (e.g., via the message handler 134) may receive and send IPMI messages to the host computer 180 through the IPMI interface.

Further, the host computer 180 may be connected to a data network 172. In one example, the host computer 180 may be a computer system in a data center. Through the data network 172, the host computer 180 may exchange data with other computer systems in the data center or exchange data with machines on the Internet.

The BMC 102 may be in communication with a communication network 170 (e.g., a local area network (LAN)). In this example, the BMC 102 may be in communication with the communication network 170 through the network interface card 119. Further, the communication network 170 may be isolated from the data network 172 and out-of-band to the data network 172. In certain configurations, the communication network 170 may not be connected to the Internet. In addition, through the communication network 170, a remote device 194 may communicate with the BMC 102. For example, the remote device 194 may send IPMI messages to the BMC 102 over the communication network 170.

The message handler 134 may receive event messages from the host computer 180 through, for example, a system interface of the communication interfaces 115. The event messages may be an Add SEL Entry Command defined by the IPMI specification. Upon receiving such event messages, the message handler 134 forwards the event messages to the SEL manager 136. The SEL manager 136 accordingly generates an SEL record entry or an OEM SEL record entry, as defined by the IPMI specification, to hold the system event data. Subsequently, the SEL manager 136 stores the SEL record entry or the OEM SEL record entry in the SEL 108. As defined by the IPMI specification, each SEL record entry and each OEM SEL record entry is 16-byte long. In addition, the SEL manager 136 may also generate an extended SEL record entry and store the extended SEL record entry in the SEL 108.

Figure 2:
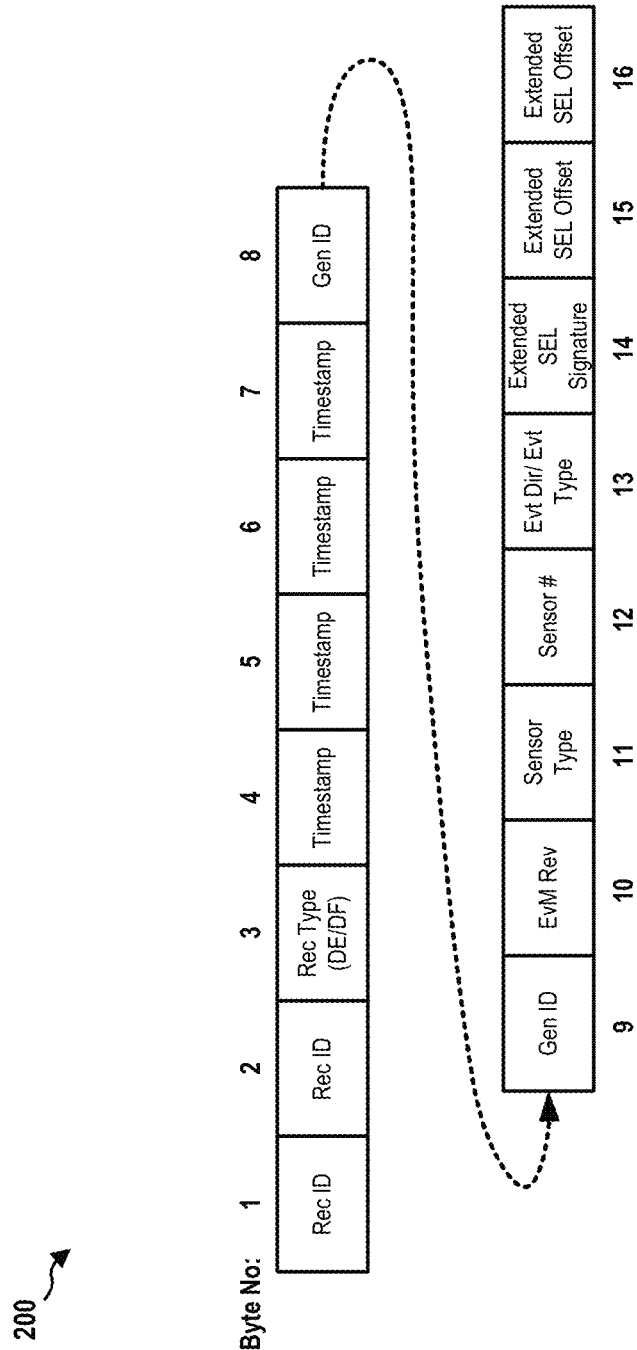
FIG. 2 is diagram illustrating the format of an extended SEL record entry.

FIG. 2 is diagram illustrating the format of an extended SEL record entry 200. As shown, an extended SEL record entry is also 16-byte long. In particular, bytes 1-2 contains Record IDs that are used for SEL Record access. Byte 3 contains Record Type indicating that the type of this record is an extended SEL record entry. In particular, the value of Byte 3 may be set to 0xDE or 0xDF for such indication. Bytes 4-7 contains Timestamp that indicates the time when event was logged. Bytes 8-9 contains Generator ID indicating the source that generated the event message. For example, the Generator ID may indicate an Intelligent Platform Management Bus (IPMB) device. The Generator ID may be a software ID if the event was generated from system software. The Generator ID may indicate a device address on an I²C bus. The Generator ID may indicate a channel number of the channel that event message was received over. Byte 10 contains Event Message Format Version. Byte 11 contains Sensor Type Code for the sensor (e.g., a CPU temperature sensor) that generated the event. Byte 12 contains Sensor Number identifying the sensor that generated the event. Byte 13 contains Event Dir and Event Type to indicate whether the event is an assertion event or a deassertion event as well as the type of trigger for the event. Byte 14 contains an extended SEL signature that indicates the start of an extended SEL offset. Bytes 15-16 contains the extended SEL offset. The extended SEL offset is a locator that points to an SEL file stored in the SEL file folder 109. For example, the extended SEL offset may be a file number, which points to an SEL file whose name contains the same file number. The SEL file contains additional event data of the event described by the extended SEL record entry 200.

Figure 3:
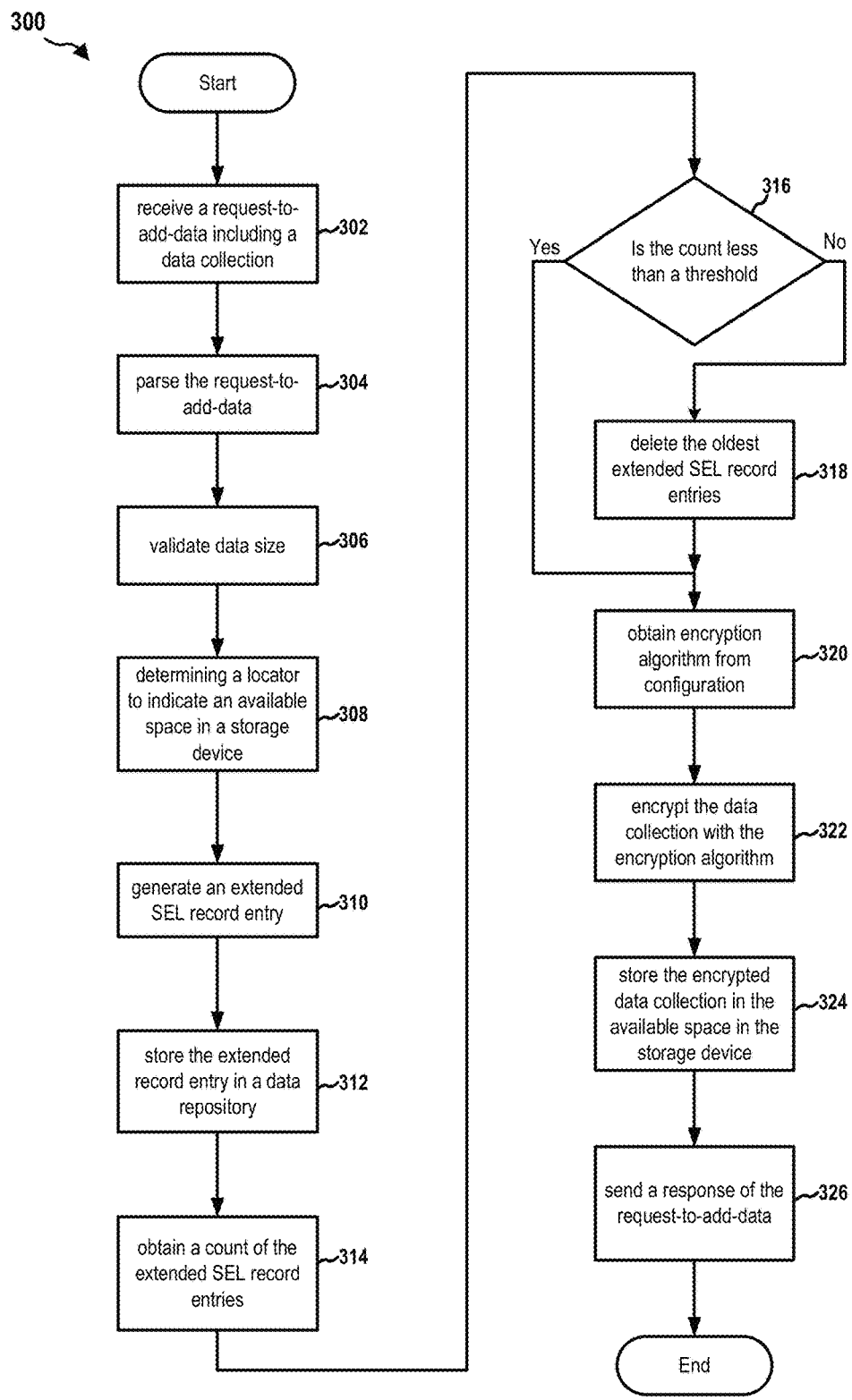
FIG. 3 is a flow chart of a method (process) for pressing a request-to-add-data.

FIG. 3 is a flow chart 300 of a method (process) for pressing a request-to-add-data. The method may be performed by a BMC (e.g., the BMC 102, the apparatus 102'). At operation 302, the message handler 134 of the BMC 102 receives a request-to-add-data including a data collection. For example, the request-to-add-data may be sent by the host computer 180. The request-to-add-data may be an add-extended-SEL-record-entry-command, which is an IPMI OEM command. The add-extended-SEL-record-entry-command may include data for Record Type, Generator ID, Event Message Format Version, Sensor Type, Sensor Number, Event Dir and Event Type, etc. In particular, the add-extended-SEL-record-entry-command also includes a data collection (i.e., event data) associated with the event. The data collection is larger than 6 bytes allowed for a OEM SEL record entry. For example, the data collection may be 1024 bytes. The message handler 134 sends the request-to-add-data to the SEL manager 136.

At operation 304, the SEL manager 136 parses the request-to-add-data to retrieve data fields as shown in FIG. 2. At operation 306, the SEL manager 136 validate the size of the event data. At operation 308, the SEL manager 136 determines a locator to indicate an available space in a storage device. In this example, the SEL manager 136 may number the files in the SEL file folder 109 according to a predetermined pattern (e.g., consecutively). As such, the SEL manager 136 may determine a file number for the next SEL file to be stored in the SEL file folder 109. The SEL manager 136 may use the file number as at least a part of the file name to identify the SEL file. Therefore, the file number can be used as a locator to locate that SEL file.

At operation 310, the SEL manager 136 generates an extended SEL record entry (as shown in FIG. 2) describing the event and including the locator. More specifically, the SEL manager 136 further generates a Record ID, a Timestamp, and an extended SEL signature. Therefore, the SEL manager 136 obtains an extended SEL record entry that contains Record Type, Generator ID, Event Message Format Version, Sensor Type, Sensor Number, Event Dir and Event Type, extended SEL signature, as well as the locator as described supra. The locator may be the file number and is stored in Bytes 15-16 of the extended SEL record entry as Extended SEL Offset. At operation 312, the SEL manager 136 stores the extended SEL record entry in the SEL 108 (i.e., a data repository).

At operation 314, the SEL manager 136 gets a count of the extended SEL record entries in the SEL 108. At operation 316, the SEL manager 136 determines whether the count is less than a predetermined threshold. When the count is not less than a predetermined threshold, at operation 318, the SEL manager 136 deletes one or more oldest extended SEL record entries based on the Timestamps of the extended SEL record entries such that the count of the remaining extended SEL record entries in the SEL 108 is less than the predetermined threshold. Subsequently, the SEL manager 136 enters operation 320. When at operation 318 the count is determined to be less than the predetermined threshold, the SEL manager 136 also enters operation 320.

At operation 320, the SEL manager 136 obtains an encryption algorithm from a configuration file (e.g., stored in the storage 117). At operation 322, the SEL manager 136 encrypts the data collection (i.e., the event data) with the obtained encryption algorithm. At operation 324, the SEL manager 136 stores the encrypted data collection in the available space in the storage device. That is, the SEL manager 136 generates an encrypted file using the event data, stores the encrypted file in the SEL file folder 109, and use the file number (i.e., the locator) as at least a part of the file name. At operation 326, the SEL manager 136 may send a response to the sender of the request-to-add-data (e.g., the host computer 180). The response may include a completion code, the size of the data collection (i.e., event data), and the Record ID of the extended SEL record entry generated for this request-to-add-data.

Figure 4:
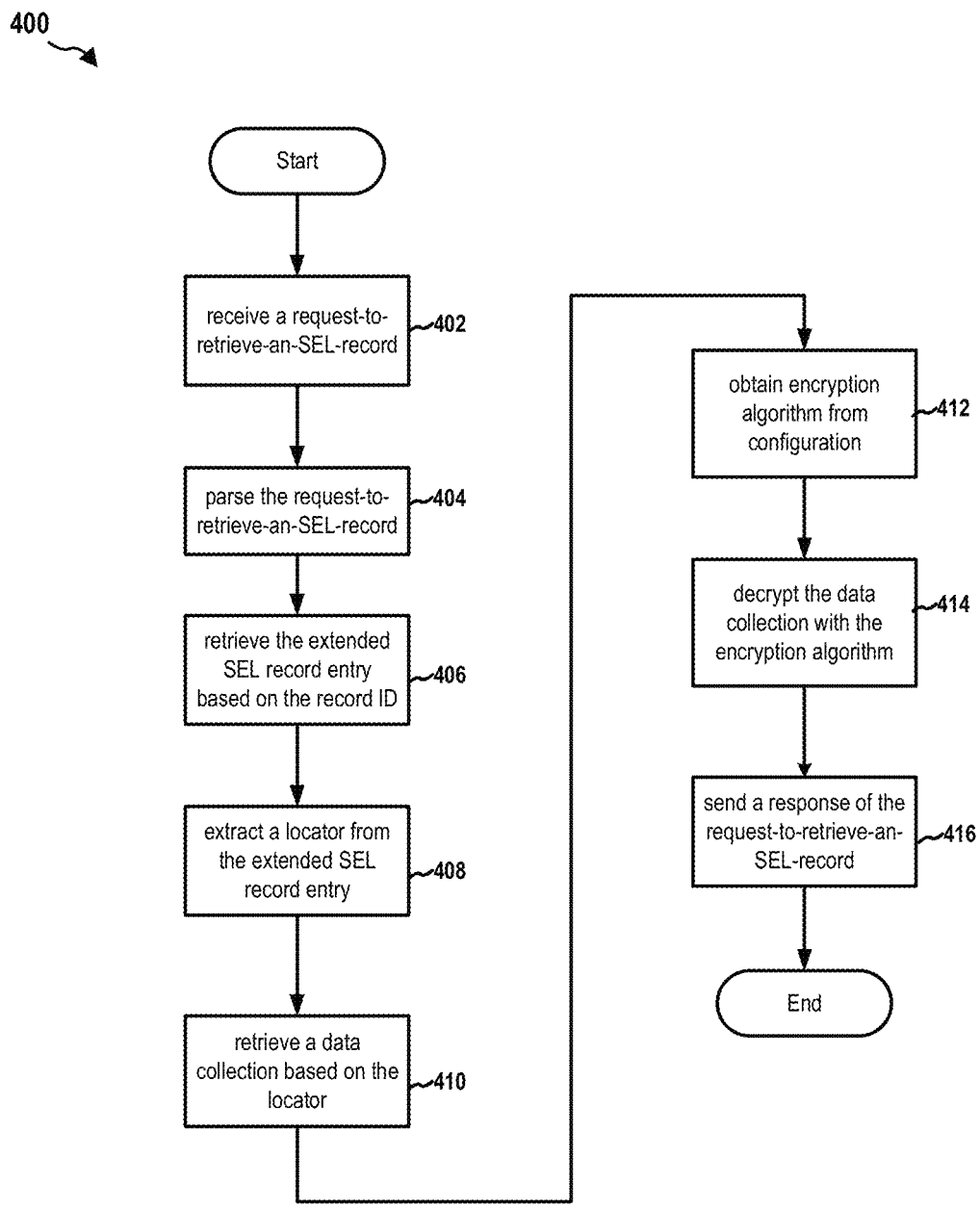
FIG. 4 is a flow chart of a method (process) for processing a request-to-retrieve-an-SEL-record.

FIG. 4 is a flow chart 400 of a method (process) for processing a request-to-retrieve-an-SEL-record. The method may be performed by a BMC (e.g., the BMC 102, the apparatus 102'). At operation 402, the message handler 134 of the BMC 102 receives a request-to-retrieve-an-SEL-record. The request-to-retrieve-an-SEL-record includes a Record ID. For example, the request-to-retrieve-an-SEL-record may be a get-extended-SEL-record-entry-command and may be sent by the host computer 180 or the remote device 194. The get-extended-SEL-record-entry-command includes the Record ID of a particular extended SEL record entry stored in the SEL 108. The message handler 134 sends the request-to-retrieve-an-SEL-record to the SEL manager 136.

At operation 404, the SEL manager 136 parses the request-to-retrieve-an-SEL-record to determine the Record ID. At operation 406, the SEL manager 136 retrieves the particular extended SEL record entry from the SEL 108 based on the record ID. That is, the SEL manager 136 searches the SEL 108 to find an extended SEL record entry that contains the same Record ID. Upon obtaining the extended SEL record entry, the SEL manager 136 further validates the extended SEL signature contained in that extended SEL record entry. At operation 408, the SEL manager 136 extracts the locator (i.e., the Extended SEL Offset) from the extended SEL record entry. In this example, the locator is a file number.

At operation 410, the SEL manager 136 retrieves the encrypted SEL file (i.e., the data collection) from the SEL file folder 109 based on the locator (e.g., the file number in the file name). At operation 412, the SEL manager 136 obtains the encryption algorithm from the configuration file (e.g., stored in the storage 117). At operation 414, the SEL manager 136 decrypts the encrypted SEL file with the obtained encryption algorithm to obtain the event data. At operation 416, the SEL manager 136 sends a response to the sender of the request-to-retrieve-an-SEL-record (e.g., the host computer 180 or the remote device 194). The response may include a completion code and the decrypted event data.

Figure 5:
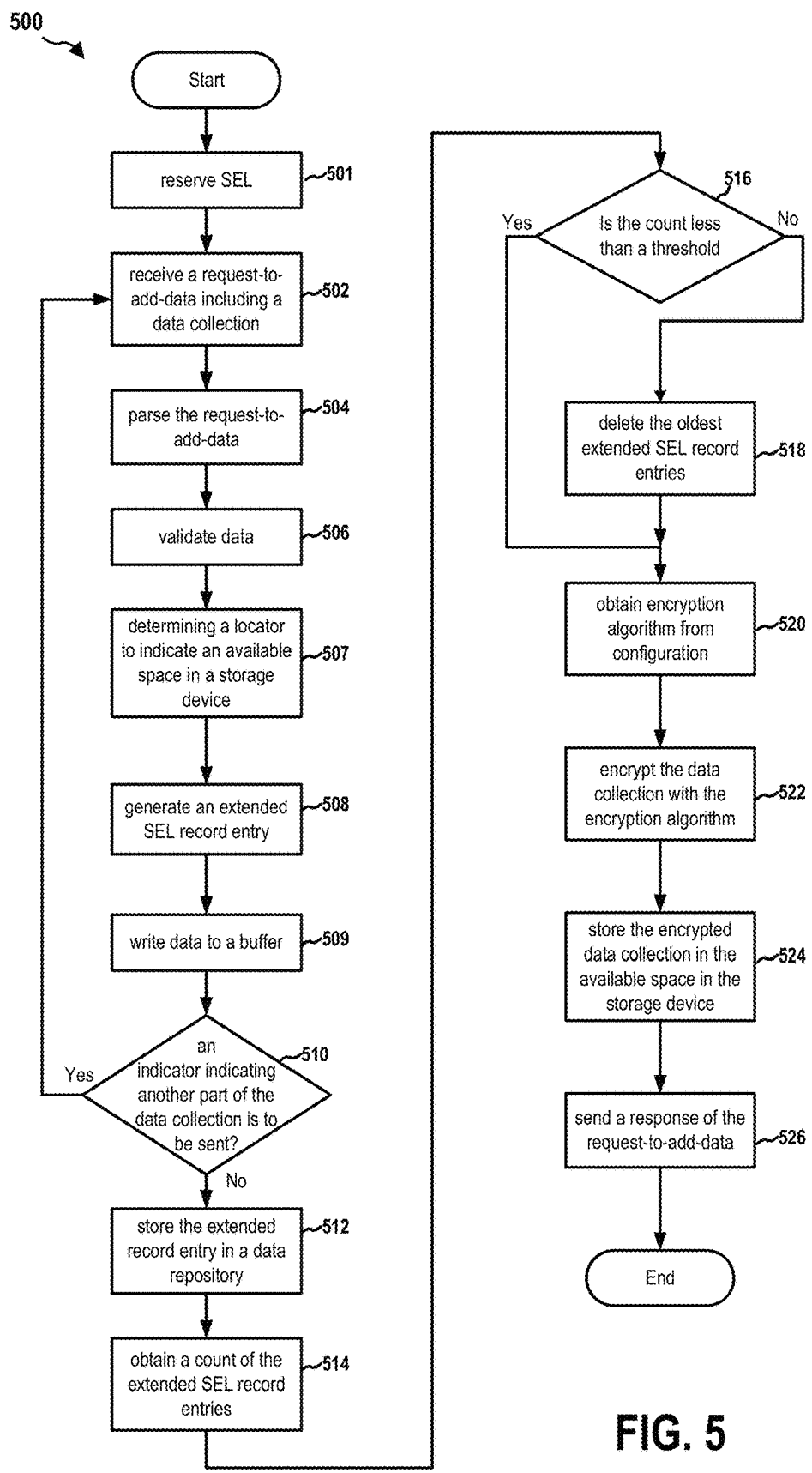
FIG. 5 is a flow chart of method (process) for processing another request-to-add-data.

FIG. 5 is a flow chart 500 of method (process) for processing another request-to-add-data. The method may be performed by a BMC (e.g., the BMC 102, the apparatus 102'). At operation 501, the message handler 134 receives a reserve SEL command from the host computer 180 (or other requesters such as the remote device 194). The message handler 134 sends the reserve SEL command to the SEL manager 136. The SEL manager 136 accordingly reserves the SEL 108 for the host computer 180 and sends a Reservation ID to the host computer 180.

At operation 502, the message handler 134 of the BMC 102 receives a request-to-add-data including a part of a data collection (i.e., event data of a system event) from the host computer 180. In this example, the request-to-add-data may be a partial-add-extended-SEL-record-entry-command, which is an IPMI OEM command. The partial-add-extended-SEL-record-entry-command may include data specifying Record Type, Generator ID, Event Message Format Version, Sensor Type, Sensor Number, Event Dir and Event Type, etc. In addition, the partial-add-extended-SEL-record-entry-command also includes the Reservation ID, a progress flag, and a part of the data collection. The data collection contains event data, which are larger than 6 bytes allowed for a OEM SEL record entry. For example, the data collection may be 1024 bytes. The message handler 134 sends the request-to-add-data to the SEL manager 136.

At operation 504, the SEL manager 136 parses the request-to-add-data to determine each data field as shown in FIG. 2. At operation 506, the SEL manager 136 also validates the data included in the partial-add-extended-SEL-record-entry-command. For example, the SEL manager 136 validates the size of the event data. The SEL manager 136 also validates the Reservation ID included in the request-to-add-data with the Reservation ID generated previously in response to the reserve SEL command.

At operation 507, the SEL manager 136 determines a locator to indicate an available space in a storage device. In this example, the SEL manager 136 may number the files in the SEL file folder 109 according to a predetermined pattern (e.g., consecutively). As such, the SEL manager 136 may determine a file number for the next SEL file to be stored in the SEL file folder 109. The SEL manager 136 may use the file number as at least a part of the file name for the SEL file. Therefore, the file number can be used as a locator to locate that file.

At operation 508, the SEL manager 136 generates an extended SEL record entry (as shown in FIG. 2) describing the event and including the locator. More specifically, the SEL manager 136 further generates a Record ID and an extended SEL signature. Therefore, the SEL manager 136 prepares an extended SEL record entry that contains Record Type, Generator ID, Event Message Format Version, Sensor Type, Sensor Number, Event Dir and Event Type, extended SEL signature, as well as the locator as described supra. The locator may be the file number and is stored as Extended SEL Offset in Bytes 15-16 of the extended SEL record entry. The SEL manager 136 also verifies that the offset is within a predetermined range. The SEL manager 136 further verifies that the allocation size of event data is within encrypted extended SEL file size. At operation 509, the SEL manager 136 writes the event data (which may be a part of a data collection as described infra) contained in the partial-add-extended-SEL-record-entry-command to a buffer.

At operation 510, the SEL manager 136 determines if the request-to-add-data includes an indicator indicating that another part of the data collection is to be sent in another request-to-add-data. In this example, the SEL manager 136 determines whether the progress flag in the partial-add-extended-SEL-record-entry-command is set. When there is an indicator (e.g., the progress flag is NOT set), the SEL manager 136 determines that the event data included in the current request-to-add-data is only a part of the entire data collection. Accordingly, the SEL manager 136 returns a response to the requester (e.g., the host computer 180). The response includes a completion code and the Record ID. Subsequently, the SEL manager 136 returns to operation 502 to receive another partial-add-extended-SEL-record-entry-command.

When the SEL manager 136 detects, at operation 510, an indicator indicating that there is no subsequent request-to-add-data including another part of the data collection (i.e., the progress flag is set in this example), the SEL manager 136, at operation 512, further generates a Timestamp and, then, stores the extended SEL record entry in the SEL 108 (i.e., a data repository) including the Timestamp.

At operation 514, the SEL manager 136 gets a count of the extended SEL record entries in the SEL 108. At operation 516, the SEL manager 136 determines whether the count is less than a predetermined threshold. When the count is not less than a predetermined threshold, at operation 518, the SEL manager 136 deletes one or more oldest extended SEL record entries based on the Timestamps of the extended SEL record entries such that the count of the remaining extended SEL record entries in the SEL 108 is less than the predetermined threshold. Subsequently, the SEL manager 136 enters operation 520. When at operation 518 the count is determined to be less than the predetermined threshold, the SEL manager 136 also enters operation 520.

At operation 520, the SEL manager 136 obtains an encryption algorithm from a configuration file (e.g., stored in the storage 117). At operation 522, the SEL manager 136 combines parts of the data collection (i.e., event data) stored in the buffer to form a complete data collection. The SEL manager 136 encrypts the data collection (i.e., the event data) with the obtained encryption algorithm. At operation 524, the SEL manager 136 stores the encrypted data collection in the available space in the storage device. That is, the SEL manager 136 generates an encrypted file using the event data, stores encrypted file in the SEL file folder 109, and use the file number (i.e., the locator) as at least a part of the file name. At operation 526, the SEL manager 136 may send a response to the sender of the request-to-add-data (e.g., the host computer 180). The response may include a completion code, the size of the data collection (i.e., event data), and the Record ID of the extended SEL record entry generated for this request-to-add-data.

Figure 6:
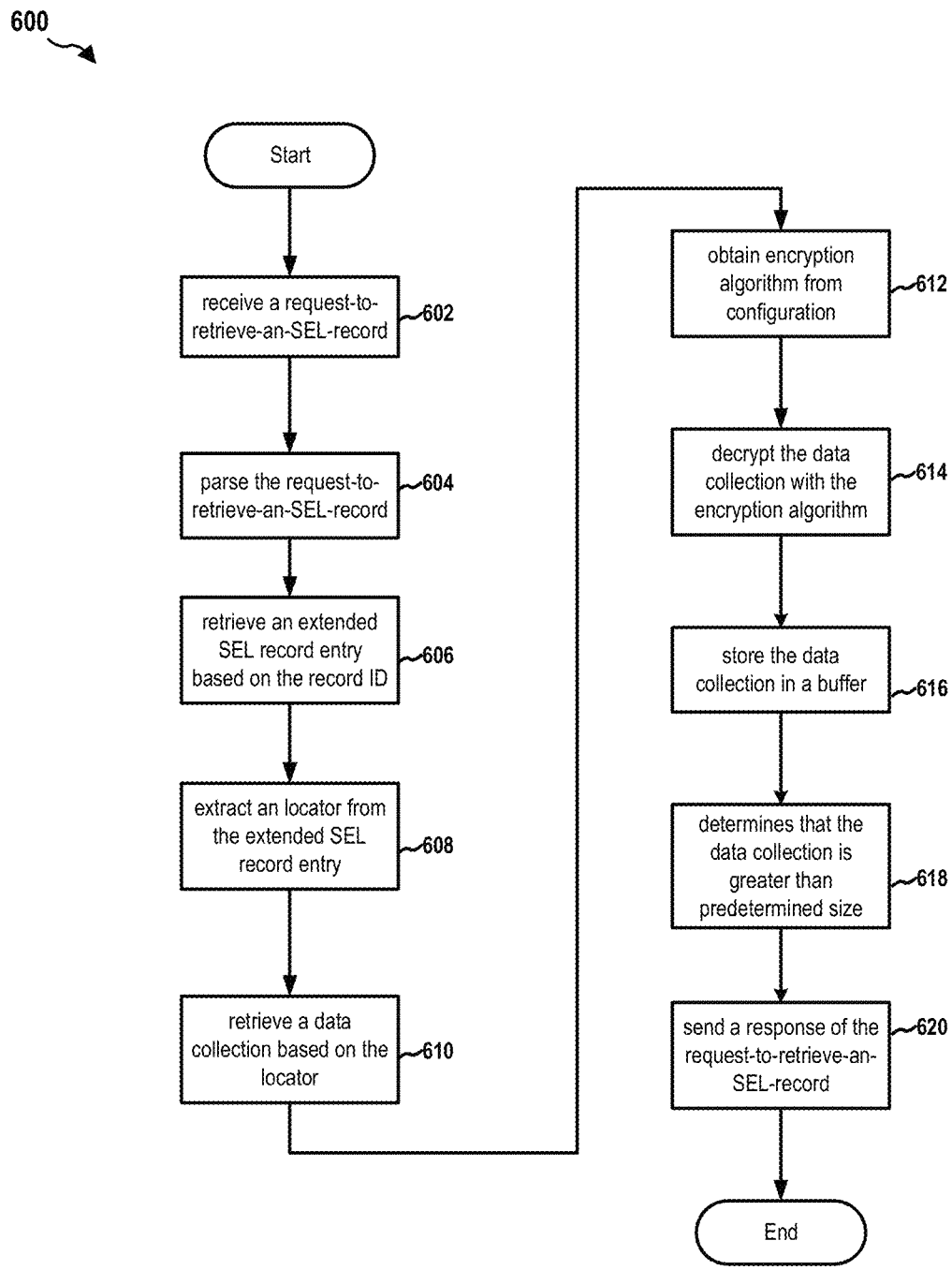
FIG. 6 is a flow chart of a method (process) for processing another request-to-retrieve-an-SEL-record.

FIG. 6 is a flow chart 600 of a method (process) for processing another request-to-retrieve-an-SEL-record. The method may be performed by a BMC (e.g., the BMC 102, the apparatus 102'). At operation 602, the message handler 134 of the BMC 102 receives, from a requester, a request-to-retrieve-an-SEL-record. The request-to-retrieve-an-SEL-record includes a Record ID. For example, the request-to-retrieve-an-SEL-record may be a partial-get-extended-SEL-record-entry-command and may be sent by the host computer 180 or the remote device 194. The partial-get-extended-SEL-record-entry-command includes the Record ID of a particular extended SEL record entry stored in the SEL 108. The message handler 134 sends the request-to-retrieve-an-SEL-record to the SEL manager 136.

At operation 604, the SEL manager 136 parses the request-to-retrieve-an-SEL-record to determine the Record ID. At operation 606, the SEL manager 136 retrieves the particular extended SEL record entry from the SEL 108 based on the record ID. That is, the SEL manager 136 searches the SEL 108 to find an extended SEL record entry that contains the same Record ID. Upon obtaining the extended SEL record entry, the SEL manager 136 further validates the extended SEL signature contained in that extended SEL record entry. At operation 608, the SEL manager 136 extracts the locator (i.e., the Extended SEL Offset) stored from the extended SEL record entry. In this example, the locator is a file number.

At operation 610, the SEL manager 136 retrieves the encrypted SEL file (i.e., the data collection) from the SEL file folder 109 based on the locator (e.g., the file number in the file name). At operation 612, the SEL manager 136 obtains the encryption algorithm from the configuration file (e.g., stored in the storage 117). At operation 614, the SEL manager 136 decrypts the encrypted SEL file with the obtained encryption algorithm to obtain the event data.

At operation 616, the SEL manager 136 stores the decrypted SEL file (i.e., a data collection) in a buffer. At operation 618, the SEL manager 136 determines that the data collection is greater than a predetermined size. At operation 620, the SEL manager 136 selects a beginning part of the data collection. The beginning part is not greater than the predetermined size. The SEL manager 136 sends a response to the sender of the request-to-retrieve-an-SEL-record (e.g., the remote device 194 or the host computer 180). The response may include a completion code and the selected part of decrypted event data. The response also includes the size of the reminder part of the data collection that has not been sent.

The requester (e.g., remote device 194) receives the response. The requester detects the indication of the size of the reminder part of the data collection that has not been sent. Subsequently, the requester sends another request-to-retrieve-an-SEL-record with the same Record ID to the BMC 102. Similar to what was described supra, the SEL manager 136 determines whether the remainder part is still greater than the predetermined size. If the remainder part is still greater than the predetermined size, the SEL manager 136 selects a beginning part of the remainder part, and sends another response to the requester including the selected part and the size of the part of the data collection that has not been sent. The requester continues sending subsequent requests-to-retrieve-an-SEL-record to the BMC 102 until receiving a response indicating that no remainder part of the data collection has not been sent.

Figure 7:
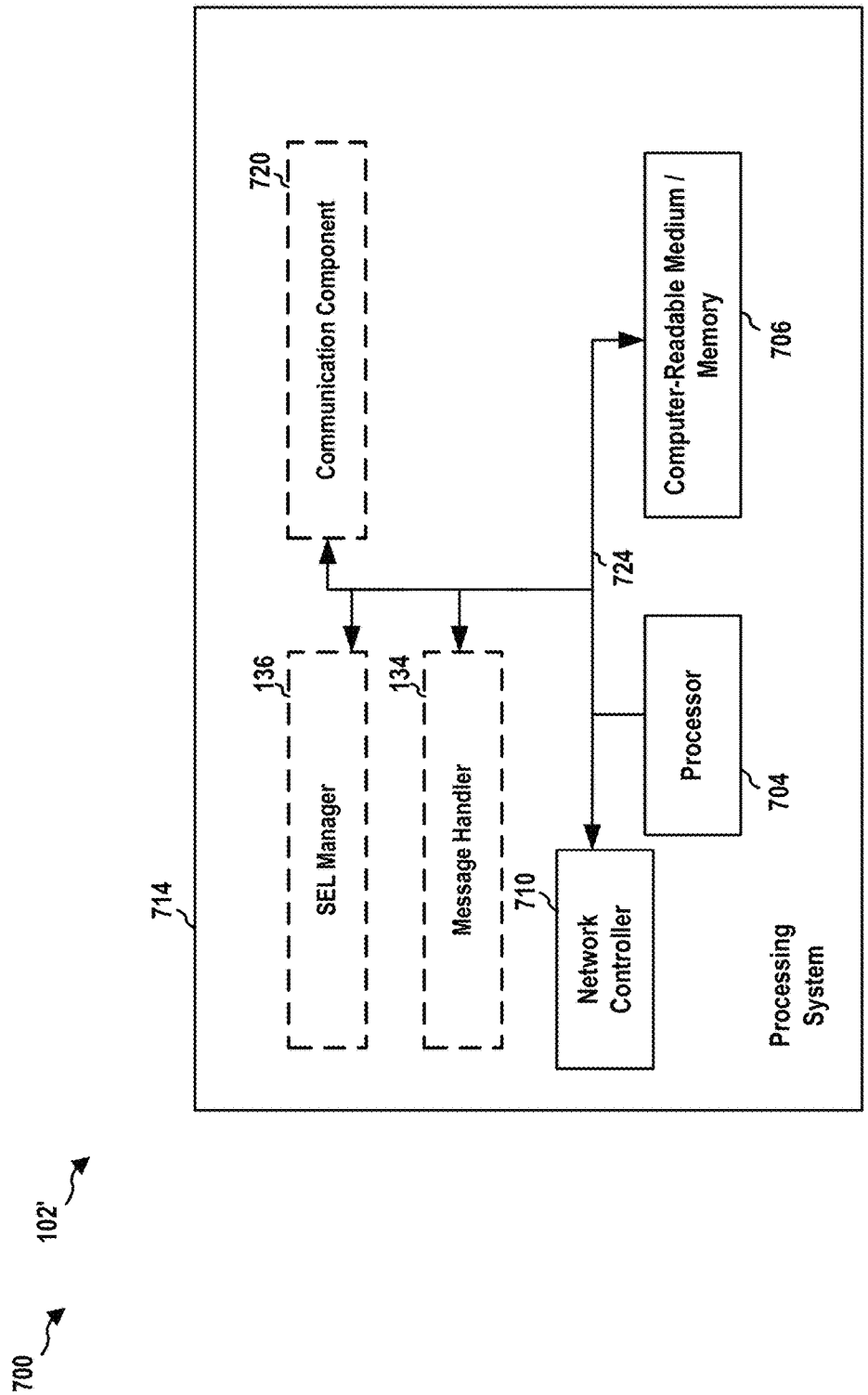
FIG. 7 is a diagram illustrating an example of a hardware implementation for an apparatus employing a processing system.

FIG. 7 is a diagram 700 illustrating an example of a hardware implementation for an apparatus 102' employing a processing system 714. The apparatus 102' may implement the BMC 102. The processing system 714 may be implemented with a bus architecture, represented generally by the bus 724 The bus 724 may include any number of interconnecting buses and bridges depending on the specific application of the processing system 714 and the overall design constraints. The bus 724 links together various circuits including one or more processors and/or hardware components, represented by the processor 704, the computer-readable medium/memory 706, a network controller 710, etc.

The computer-readable medium/memory 706 may include the memory 114 and/or the storage 117 The bus 724 may also link various other circuits such as timing sources, peripherals, voltage regulators, and power management circuits, which are well known in the art, and therefore, will not be described any further.

The processing system 714 may be coupled to the network controller 710. The network controller 710 provides a means for communicating with various other apparatus over a network. The network controller 710 receives a signal from the network, extracts information from the received signal, and provides the extracted information to the processing system 714, specifically a communication component 720 of the apparatus 102'. In addition, the network controller 710 receives information from the processing system 714, specifically the communication component 720, and based on the received information, generates a signal to be sent to the network. The processing system 714 includes a processor 704 coupled to a computer-readable medium/memory 706. The processor 704 is responsible for general processing, including the execution of software stored on the computer-readable medium/memory 706. The software, when executed by the processor 704, causes the processing system 714 to perform the various functions described supra for any particular apparatus. The computer-readable medium/memory 706 may also be used for storing data that is manipulated by the processor 704 when executing software. The processing system further includes at least one of the message handler 134 and the SEL manager 136. The components may be software components running in the processor 704, resident/stored in the computer readable medium/memory 706, one or more hardware components coupled to the processor 704, or some combination thereof.

The apparatus 102' may be configured to include means for performing operations described supra referring to FIGS. 3-6. The aforementioned means may be one or more of the aforementioned components of the apparatus 102 and/or the processing system 714 of the apparatus 102' configured to perform the functions recited by the aforementioned means.

Figure 8:
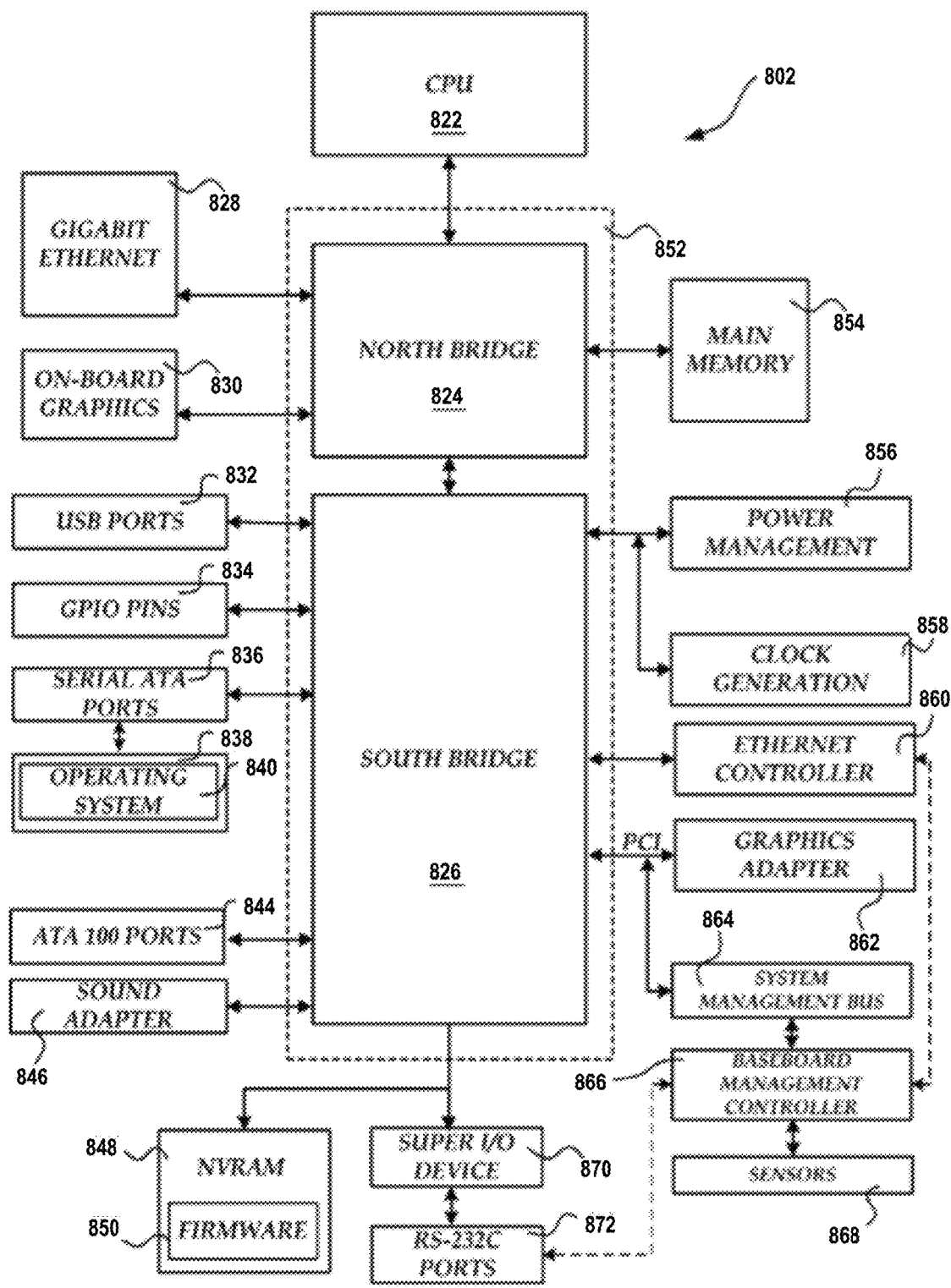
FIG. 8 shows a computer architecture for a computer.

FIG. 8 and the following discussion are intended to provide a brief, general description of one suitable computing environment in which aspects of the embodiments described herein may be implemented. In particular, FIG. 8 shows a computer architecture for a computer 802 that may be utilized to embody the host computer 180, as described supra. It should be appreciated that the computer architecture shown in FIG. 8 is merely illustrative and that other types of computers and computing devices may also be utilized to implement aspects of the embodiments presented herein.

While aspects presented herein include computer programs that execute in conjunction with the execution of an operating system, those skilled in the art will recognize that the embodiments may also be implemented in combination with other program modules and/or hardware devices. As described herein, computer programs include routines, programs, components, data structures, and other types of structures that perform particular tasks or implement particular abstract data types. Moreover, those skilled in the art will appreciate that the embodiments described herein may be practiced with other computer system configurations, including hand-held devices, multiprocessor systems, microprocessor-based or programmable consumer electronics, minicomputers, mainframe computers, and the like. The embodiments described herein may also be practiced in distributed computing environments where tasks are performed by remote processing devices that are linked through a communications network. In a distributed computing environment, program modules may be located in both local and remote memory storage devices.

The computer 802 shown in FIG. 8 includes a baseboard, or "motherboard," which is a printed circuit board to which a multitude of components or devices may be connected by way of a system bus or other electrical communication path. In one illustrative embodiment, a CPU 822 operates in conjunction with a chipset 852. The CPU 822 is a standard central processor that performs arithmetic and logical operations necessary for the operation of the computer. The server computer 802 may include a multitude of CPUs 822.

The chipset 852 includes a north bridge 824 and a south bridge 826. The north bridge 824 provides an interface between the CPU 822 and the remainder of the computer 802. The north bridge 824 also provides an interface to a random access memory ("RAM") used as the main memory 854 in the computer 802 and, possibly, to an on-board graphics adapter 830. The north bridge 824 may also include functionality for providing networking functionality through a gigabit Ethernet adapter 828. The gigabit Ethernet adapter 828 is capable of connecting the computer 802 to another computer via a network. Connections which may be made by the network adapter 828 may include LAN or WAN connections. LAN and WAN networking environments are commonplace in offices, enterprise-wide computer networks, intranets, and the internet. The north bridge 824 is connected to the south bridge 826.

The south bridge 826 is responsible for controlling many of the input/output functions of the computer 802. In particular, the south bridge 826 may provide one or more USB ports 832, a sound adapter 846, an Ethernet controller 860, and one or more GPIO pins 834. The south bridge 826 may also provide a bus for interfacing peripheral card devices such as a graphics adapter 862. In one embodiment, the bus comprises a PCI bus. The south bridge 826 may also provide a system management bus 864 for use in managing the various components of the computer 802. Additional details regarding the operation of the system management bus 864 and its connected components are provided below.

The south bridge 826 is also operative to provide one or more interfaces for connecting mass storage devices to the computer 802. For instance, according to an embodiment, the south bridge 826 includes a serial advanced technology attachment ("SATA") adapter for providing one or more SATA ports 836 and an ATA 100 adapter for providing one or more ATA 100 ports 844. The SATA ports 836 and the ATA 100 ports 844 may be, in turn, connected to one or more mass storage devices such as the SATA disk drive 838 storing an operating system 840 and application programs.

As known to those skilled in the art, an operating system 840 comprises a set of programs that control operations of a computer and allocation of resources. An application program is software that runs on top of the operating system software, or other runtime environment, and uses computer resources to perform application specific tasks desired by the user. According to one embodiment of the invention, the operating system 840 comprises the LINUX operating system. According to another embodiment of the invention the operating system 840 comprises an operating system within the WINDOWS family of operating systems from MICROSOFT CORPORATION. According to another embodiment, the operating system 840 comprises the UNIX, LINUX, or SOLARIS operating system. It should be appreciated that other operating systems may also be utilized.

The mass storage devices connected to the south bridge 826, and their associated computer storage media, provide non-volatile storage for the computer 802. Although the description of computer storage media contained herein refers to a mass storage device, such as a hard disk or CD-ROM drive, it should be appreciated by those skilled in the art that computer storage media can be any available media that can be accessed by the computer 802.

By way of example, and not limitation, computer storage media may comprise volatile and non-volatile, removable and non-removable media implemented in any method or technology for storage of information such as computer-readable instructions, data structures, program modules or other data. Computer storage media also includes, but is not limited to, RAM, ROM, EPROM, EEPROM, flash memory or other solid state memory technology, CD-ROM, DVD, HD-DVD, BLU-RAY, or other optical storage, magnetic cassettes, magnetic tape, magnetic disk storage or other magnetic storage devices, or any other medium which can be used to store the desired information and which can be accessed by the computer.

According to embodiments, a low pin count ("LPC") interface may also be provided by the south bridge 826 for connecting a "Super I/O" device 870. The Super I/O device 870 is responsible for providing a number of input/output ports, including a keyboard port, a mouse port, a serial interface 872, a parallel port, and other types of input/output ports. The LPC interface may also connect a computer storage media such as a ROM or a flash memory such as a NVRAM 848 for storing the firmware 850 that includes program code containing the basic routines that help to start up the computer 802 and to transfer information between elements within the computer 802.

As described briefly above, the south bridge 826 may include a system management bus 864. The system management bus 864 may include a BMC 866. The BMC 866 may be the BMC 102. In general, the BMC 866 is a microcontroller that monitors operation of the computer system 802. In a more specific embodiment, the BMC 866 monitors health-related aspects associated with the computer system 802, such as, but not limited to, the temperature of one or more components of the computer system 802, speed of rotational components (e.g., spindle motor, CPU Fan, etc.) within the system, the voltage across or applied to one or more components within the system 802, and the available or used capacity of memory devices within the system 802. To accomplish these monitoring functions, the BMC 866 is communicatively connected to one or more components by way of the management bus 864. In an embodiment, these components include sensor devices 868 for measuring various operating and performance-related parameters within the computer system 802. The sensor devices 868 may be either hardware or software based components configured or programmed to measure or detect one or more of the various operating and performance-related parameters.

It should also be appreciated that the computer 802 may comprise other types of computing devices, including handheld computers, embedded computer systems, personal digital assistants, and other types of computing devices known to those skilled in the art. It is also contemplated that the computer 802 may not include all of the components shown in FIG. 8, may include other components that are not explicitly shown in FIG. 8, or may utilize an architecture completely different than that shown in FIG. 8.

It is understood that the specific order or hierarchy of blocks in the processes/flowcharts disclosed is an illustration of exemplary approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

What is claimed is:

1. A method of operating a baseboard management controller (BMC), comprising:
   receiving a message through a communication interface of the BMC, the message containing a request-to-add-data including event data associated with an event, the event data including a data collection;
   storing the data collection at a location in a file space on a storage device of the BMC;
   determining a locator to indicate the location;
   generating an extended system event log (SEL) record entry describing the event and including the locator;
   storing the SEL record entry in a data repository external to the file space on the storage device; and
   retrieving the data collection based on the locator in response to receiving a request-to-retrieve-an-SEL-record.

2. The method of claim 1, further comprising:
   encrypting the data collection prior to the storing, wherein the encrypted data collection is stored in a file in the file space.

3. The method of claim 1, wherein the generating the extended SEL record entry comprises:
   generating a record identification (ID) for the extended SEL record entry; and
   including the record ID in the extended SEL record entry; the method further comprising:
   sending a response of the request-to-add-data, the response of the request-to-add-data including the record ID.

4. The method of claim 3, wherein the request-to-retrieve-an-SEL-record includes the record ID, the method further comprising:
   retrieving the extended SEL record entry from the data repository based on the record ID; and
   extracting the locator from the extended SEL record entry.

5. The method of claim 4, further comprising:
   receiving the request-to-retrieve-an-SEL-record; and
   sending a first response of the request-to-retrieve-an-SEL-record, the first response including at least a part the data collection.

6. The method of claim 5, further comprising:
   determining that the data collection is greater than a predetermined size, wherein the data collection is stored in a buffer;
   selecting a first part of the data collection stored in the buffer, wherein the at least a part the data collection included in the first response is the first part; and
   determining a size of a part of the data collection that has not been sent in any response, wherein the first response further includes an indication of the size.

7. The method of claim 6, further comprising:
   receiving a second request-to-retrieve-an-SEL-record including the record ID;
   selecting a second part of the data collection that has not been sent in any response; and
   sending a second response of the second request-to-retrieve-an-SEL-record, the second response including the second part the data collection.

8. The method of claim 1, further comprising:
   receiving a first request-to-add-data including a first part of the data collection and an indicator indicating that another part of the data collection is to be sent in another request-to-add-data; and
   storing the first part of the data collection in a buffer.

9. The method of claim 8, further comprising:
   receiving a second request-to-add-data including a second part of the data collection; and
   storing the second part of the data collection in a buffer.

10. The method of claim 9, wherein the second request-to-add-data further includes an indicator indicating that there is no subsequent request-to-add-data including another part of the data collection, the method further comprising:
    detecting the indicator;
    combining parts of the data collection stored in the buffer to form a complete data collection; and
    reading the complete data collection from the buffer.

11. An apparatus, the apparatus being a baseboard management controller (BMC), comprising:
    a memory; and
    at least one microprocessor coupled to the memory and configured to:
    receive a message through a communication interface of the BMC, the message containing a request-to-add-data including event data associated with an event, the event data including a data collection;
    store the data collection at a location in a file space on a storage device of the BMC;
    determine a locator to indicate the location,
    generate an extended system event log (SEL) record entry describing the event and including the locator;
    store the SEL record entry in a data repository external to the file space on the storage device, and retrieve the data collection based on the locator in response to receiving a request-to-retrieve-an-SEL-record.

12. The apparatus of claim 11, wherein the at least one processor is further configured to:
    encrypt the data collection prior to the storing, wherein the encrypted data collection is stored in a file in the file space.

13. The apparatus of claim 12, wherein to generate the extended SEL record entry, the at least one processor is further configured to:
    generate a record identification (ID) for the extended SEL record entry; and
    include the record ID in the extended SEL record entry;
    wherein the at least one processor is further configured to:
    send a response of the request-to-add-data, the response of the request-to-add-data including the record ID.

14. The apparatus of claim 13, wherein the request-to-retrieve-an-SEL-record includes the record ID, wherein the at least one processor is further configured to:
    retrieve the extended SEL record entry from the data repository based on the record ID; and
    extract the locator from the extended SEL record entry.

15. The apparatus of claim 14, wherein the at least one processor is further configured to:
    receive the request-to-retrieve-an-SEL-record; and
    send a first response of the request-to-retrieve-an-SEL-record, the first response including at least a part the data collection.

16. The apparatus of claim 15, wherein the at least one processor is further configured to:
    determine that the data collection is greater than a predetermined size, wherein the data collection is stored in a buffer;
    select a first part of the data collection stored in the buffer, wherein the at least a part the data collection included in the first response is the first part; and
    determine a size of a part of the data collection that has not been sent in any response, wherein the first response further includes an indication of the size.

17. The apparatus of claim 16, wherein the at least one processor is further configured to:
    receive a second request-to-retrieve-an-SEL-record include the record ID;
    select a second part of the data collection that has not been sent in any response; and
    send a second response of the second request-to-retrieve-an-SEL-record, the second response including the second part the data collection.

18. The apparatus of claim 12, wherein the at least one processor is further configured to:
    receive a first request-to-add-data including a first part of the data collection and an indicator indicating that another part of the data collection is to be sent in another request-to-add-data; and
    store the first part of the data collection in a buffer.

* * * * *